United States Patent [19]

Aihara

[11] Patent Number: 4,751,668
[45] Date of Patent: Jun. 14, 1988

[54] PORTABLE ELECTRONIC MEMORANDUM DEVICE

[75] Inventor: Fumikazu Aihara, Tokyo, Japan

[73] Assignee: Casio Computer Co., Ltd., Tokyo, Japan

[21] Appl. No.: 711,077

[22] Filed: Mar. 12, 1985

[30] Foreign Application Priority Data

Mar. 23, 1984 [JP] Japan .................................. 59-54388
Mar. 28, 1984 [JP] Japan .................................. 59-58340

[51] Int. Cl.[4] .......................... G09G 3/00; G06F 3/14
[52] U.S. Cl. .................................. 364/900; 364/710; 340/802
[58] Field of Search ... 364/200 MS File, 900 MS File, 364/705, 706, 708, 709, 710, 518; 340/802, 715

[56] References Cited

U.S. PATENT DOCUMENTS

| | | | |
|---|---|---|---|
| 3,942,157 | 3/1976 | Azure | 340/172.5 |
| 3,999,050 | 12/1976 | Pitroda | 235/152 |
| 4,016,542 | 5/1977 | Azure | 364/900 |
| 4,090,247 | 5/1978 | Martin | 364/900 |
| 4,117,542 | 9/1978 | Klausner et al. | 364/900 |
| 4,125,871 | 11/1978 | Martin | 364/900 |
| 4,270,182 | 5/1981 | Asija | 364/900 |
| 4,279,022 | 7/1981 | Abe | 364/900 |
| 4,301,511 | 11/1981 | Shimizu et al. | 364/709 |
| 4,354,260 | 10/1982 | Planzo | 368/10 |
| 4,385,291 | 5/1983 | Piguet | 340/712 |
| 4,402,056 | 8/1983 | Sado et al. | 364/900 |

FOREIGN PATENT DOCUMENTS

| | | |
|---|---|---|
| 1579471 | 11/1980 | United Kingdom . |
| 2048532A | 12/1980 | United Kingdom . |
| 2056730 | 3/1981 | United Kingdom . |
| 2090031 | 6/1982 | United Kingdom . |
| 2106290 | 4/1983 | United Kingdom . |
| 2128006A | 4/1984 | United Kingdom . |
| 2132396A | 7/1984 | United Kingdom . |
| 2143066 | 1/1985 | United Kingdom . |

Primary Examiner—Gareth D. Shaw
Assistant Examiner—Kevin A. Kriess
Attorney, Agent, or Firm—Frishauf, Holtz, Goodman & Woodward

[57] ABSTRACT

A portable electronic memorandum device has a memory for storing character data items. When a switch is operated, all the address areas of the memory are designated so as to sequentially read out all the character data items stored therein. All the character data items are then sequentially displayed on a display. After all the character data items stored in all the address areas are sequentially displayed on the display, the address of the memory is updated by the operation of switches, thus performing an edit operation of the character data items. -

19 Claims, 15 Drawing Sheets

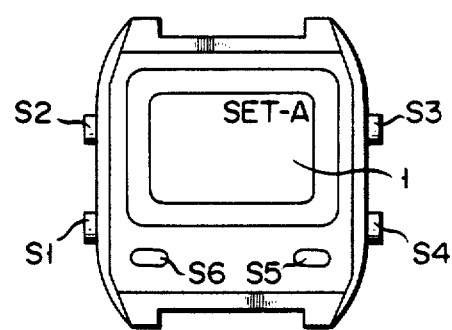
FIG. 1
FIG. 2
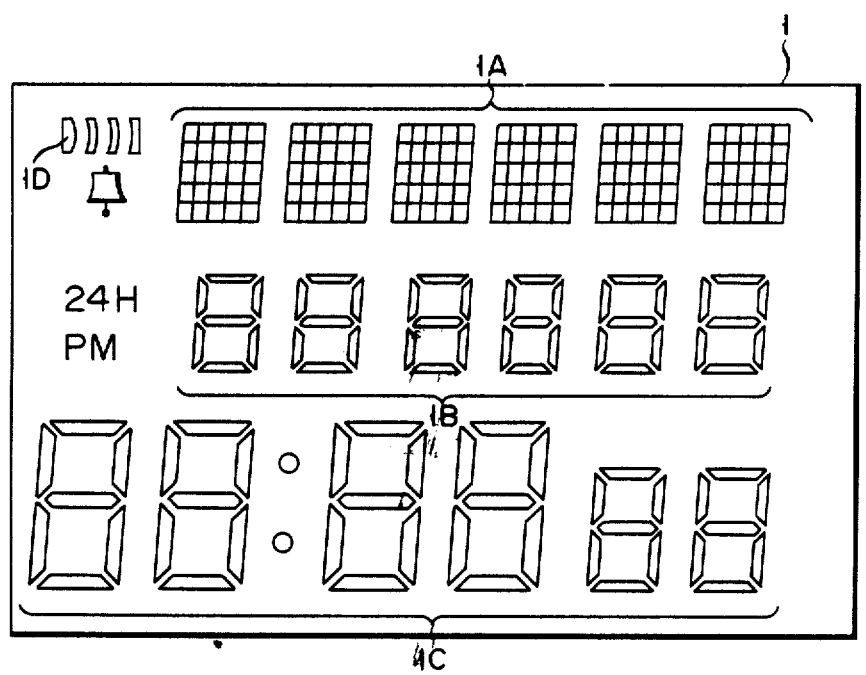

FIG. 6
| ADDRESS | CHARACTER DATA MEMORY AREA | | | | | | NUMERICAL DATA MEMORY AREA | | | | | | | | | |
|---|---|---|---|---|---|---|---|---|---|---|---|---|---|---|---|---|
| 00000 | A | O | K | I | | | 0 | 5 | 5 | 2 | | 4 | 1 | 6 | 8 | 2 | 8 |
| 00001 | C | A | S | I | O | | 0 | 4 | 2 | 5 | | 7 | 7 | 8 | 2 | 4 | 1 |
| 00010 | S | U | Z | U | K | I | 0 | 4 | 2 | 5 | | 5 | 5 | 7 | 2 | 1 | 1 |
| 00011 | | | | | | | | | | | | | | | | | |
| 00100 | | | | | | | | | | | | | | | | | |
FIG. 8A
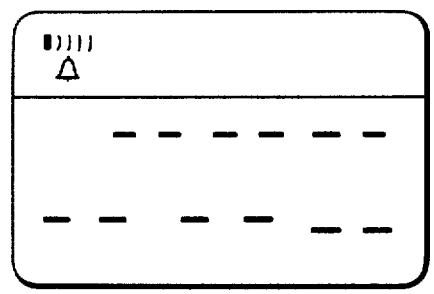
FIG. 8B
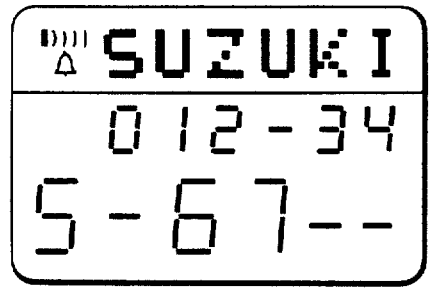

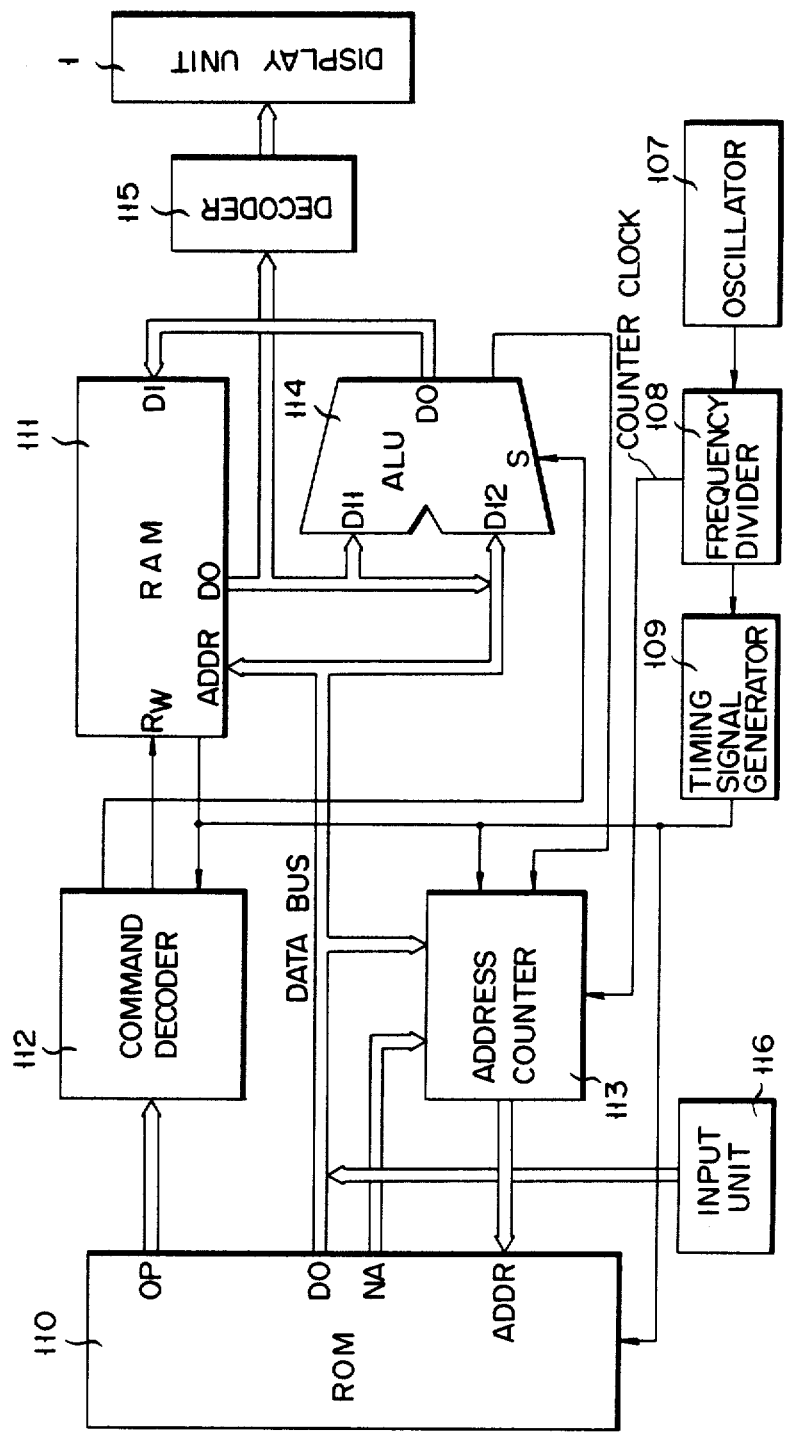

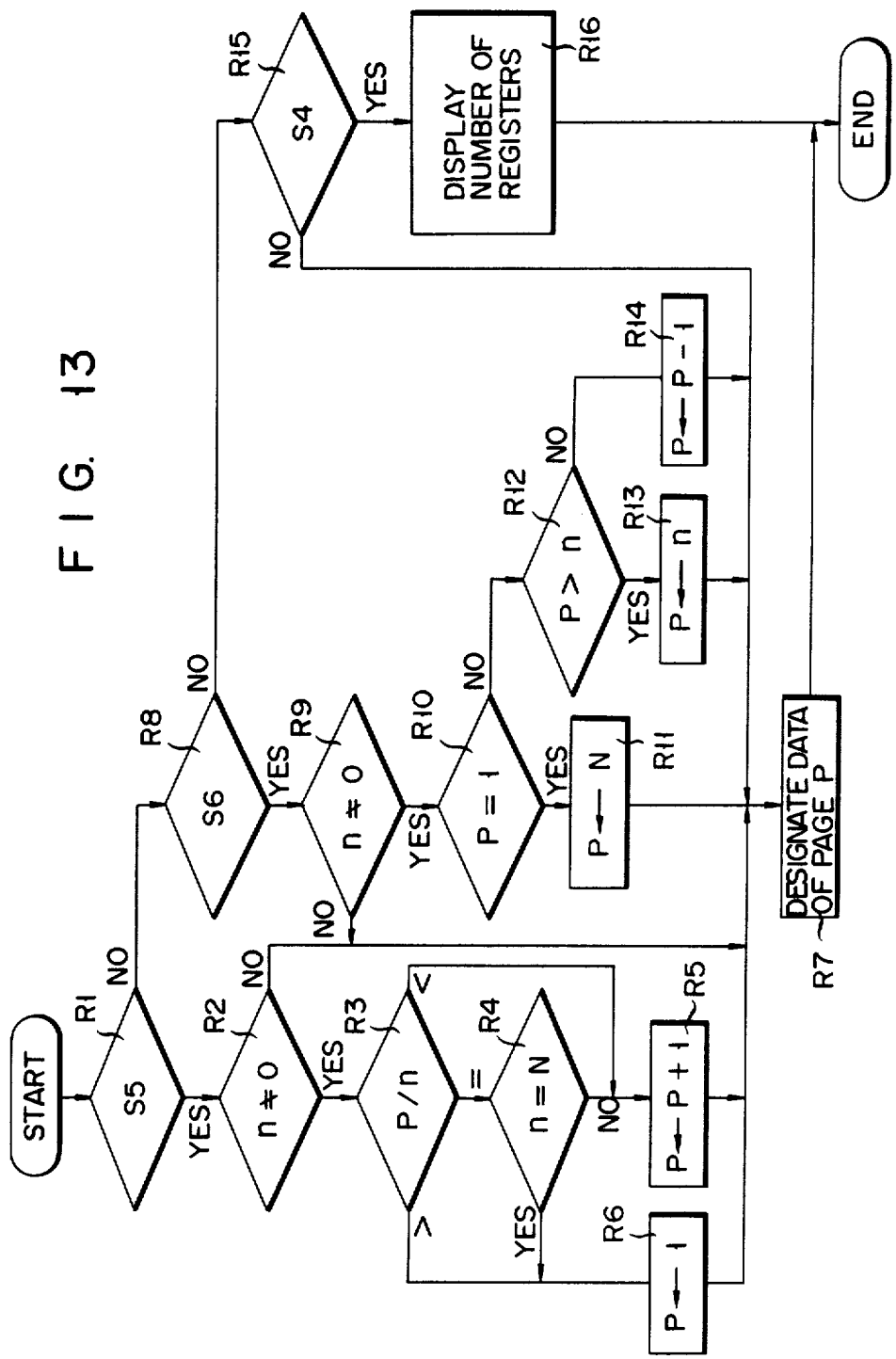
F I G. 13

F I G. 16
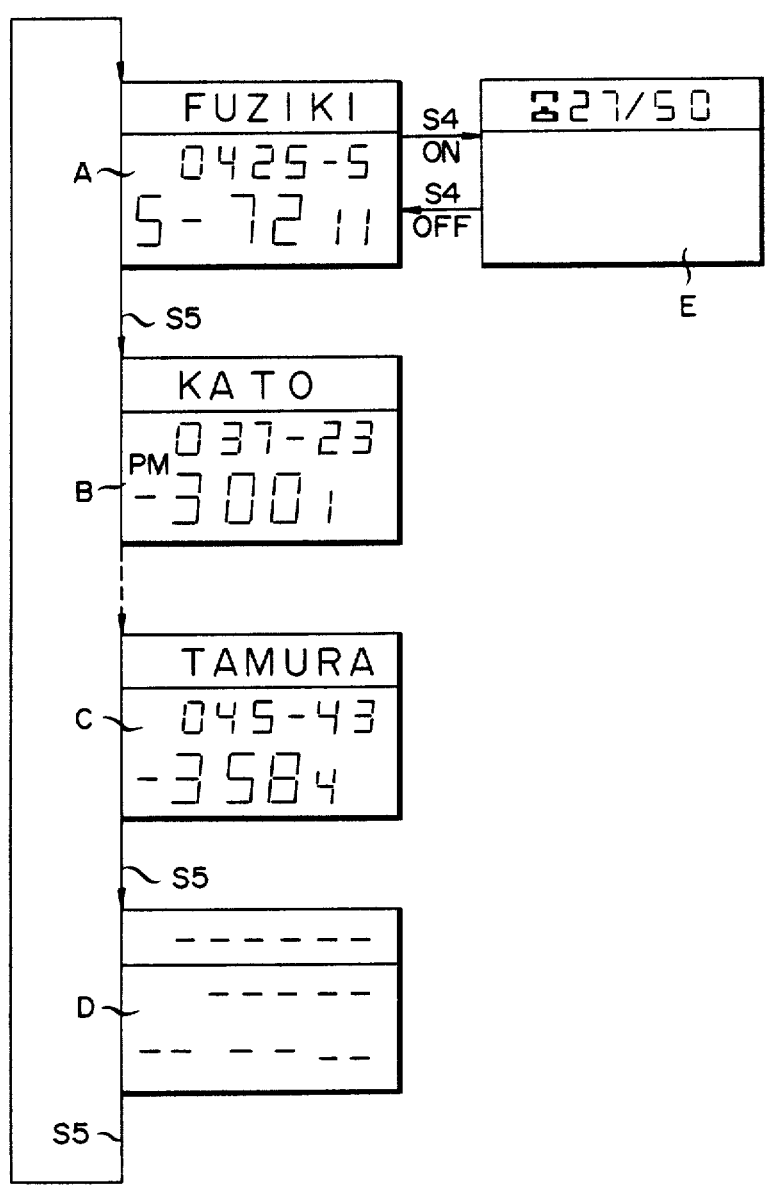

PORTABLE ELECTRONIC MEMORANDUM DEVICE

BACKGROUND OF THE INVENTION

This invention relates to a portable electronic memorandum device comprising a data memory which can electronically read/write character data items such as telephone numbers, addresses, schedules and the like.

Modern electronic watches and small electronic calculators can store character data items such as names, telephone numbers, addresses, schedules, and the like by means of a data input means from a keyboard in addition to its original function. A desired character data item can be read out for display.

For example, a device disclosed in U.S. Pat. No. 3,999,050 has a keyboard consisting of letter, numerial, and function keys and stores a name, a telephone number and a time to call in a data memory by means of the above keys. When it is the time to make a predetermined call, the name and telephone number to call are displayed on a display unit.

Another prior art device disclosed in U.S. Pat. No. 4,117,542 comprises a keyboard consisting of keys for designating letters, numerals and functions, and stores telephone numbers, street addresses, appointments, an agenda and the like in a data memory means. When letters representing a desired name are keyed in, the telephone number and the address of the corresponding person are read out from the data memory means so as to display them on a display unit.

In these prior art devices, the data is written/read from the data memory by operation of the keys on the keyboard, resulting in a complex input/output circuit configuration. Therefore, it is difficult to apply these techniques to small electronic equipment, such as wristwatches.

SUMMARY OF THE INVENTION

The present invention has been made in consideration of the above drawbacks of the prior art, and has as its object to provide a portable electronic memorandom device which can simplify input/output operations of telephone numbers, names, messages and the like and an input/output circuit therefor, and which can be applied to small electronic equipment such as a wristwatch.

In order to achieve the above object according to the present invention, there is provided a portable electronic memorandum device comprising input means for inputting a character data item including at least character data; character data item storing means, having a plurality of address areas, for storing in the respective address areas the character data items inputted by the input means; switching means operative for reading the character data item stored in the character data item storing means so as to display it; character data item read out control means for sequentially designating all the address areas of the character data item storing means every time the switching means is operated so that all the character data items stored in the respective address areas are sequentially read out; optical displaying means for sequentially displaying the character data items read out by the read out control means; and address designation changing means for sequentially designating the address areas in which the character data items are stored when the switching means is operated again after all the address areas in which the character data items are stored are designated by said switching means and all the character data items have been displayed on the optical displaying means. With the above arrangement, the portable electronic memorandum device according to the present invention can write/read a character data item such as a name by a sequential address designation to/from a character data item memory with a simple key operation, and an input/output circuit can also be simplified. For this reason, the device can be applied to small electronic devices, such as a wristwatch. Furthermore, when the character data item is read, only the character data item stored need be retrieved. Thus, when the retrieval operation of the character data item to be read ends, even if the remaining memory areas are present, an extra sequential retrieval operation is not performed, and the address designating operation can be switched to designate the first address at which the character data item is stored, thus simplifying the retrieval operation.

BRIEF DESCRIPTION OF THE DRAWINGS

FIG. 1 is a plan view showing an electronic wristwatch to which the present invention is applied;

FIG. 2 is a view showing an arrangement of a display unit 1 shown in FIG. 1;

FIG. 6 shows a memory map of a RAM 41 shown in FIG. 5;

FIGS. 8A and 8B are representations showing display states of a hyphen on the display unit;

FIG. 9 is a view showing an arrangement according to another embodiment of the present invention for executing various functions by means of a ROM storing a microprogram;

FIG. 13 is a flow chart of a read operation in the circuit shown in FIG. 9;

FIG. 16 is a representation showing changes in display states on the display unit in the read mode.

DETAILED DESCRIPTION OF THE PREFERRED EMBODIMENTS

An embodiment of the present invention will be described with reference to the accompanying drawings. FIG. 1 is a plan view of an electronic wristwatch with a data memory function. Push-button switches S1 to S4 are provided at two side portions of a watch casing. A liquid crystal display unit 1 is provided on the upper surface of the watch casing, and push-button switches S5 and S6 are provided below the display unit 1.

The display unit 1 has an arrangement shown in FIG. 2. The display unit 1 comprises a matrix display portion 1A having 6 digits each consisting of (5×5) dots at an upper portion thereof, a sub digital display portion 1B of 6-digit 8-segment displays at an intermediate portion thereof, a main digital display portion 1C of 6-digit 8-segment displays at a lower portion thereof, and an alarm ON mark 1D.

Figure 3:
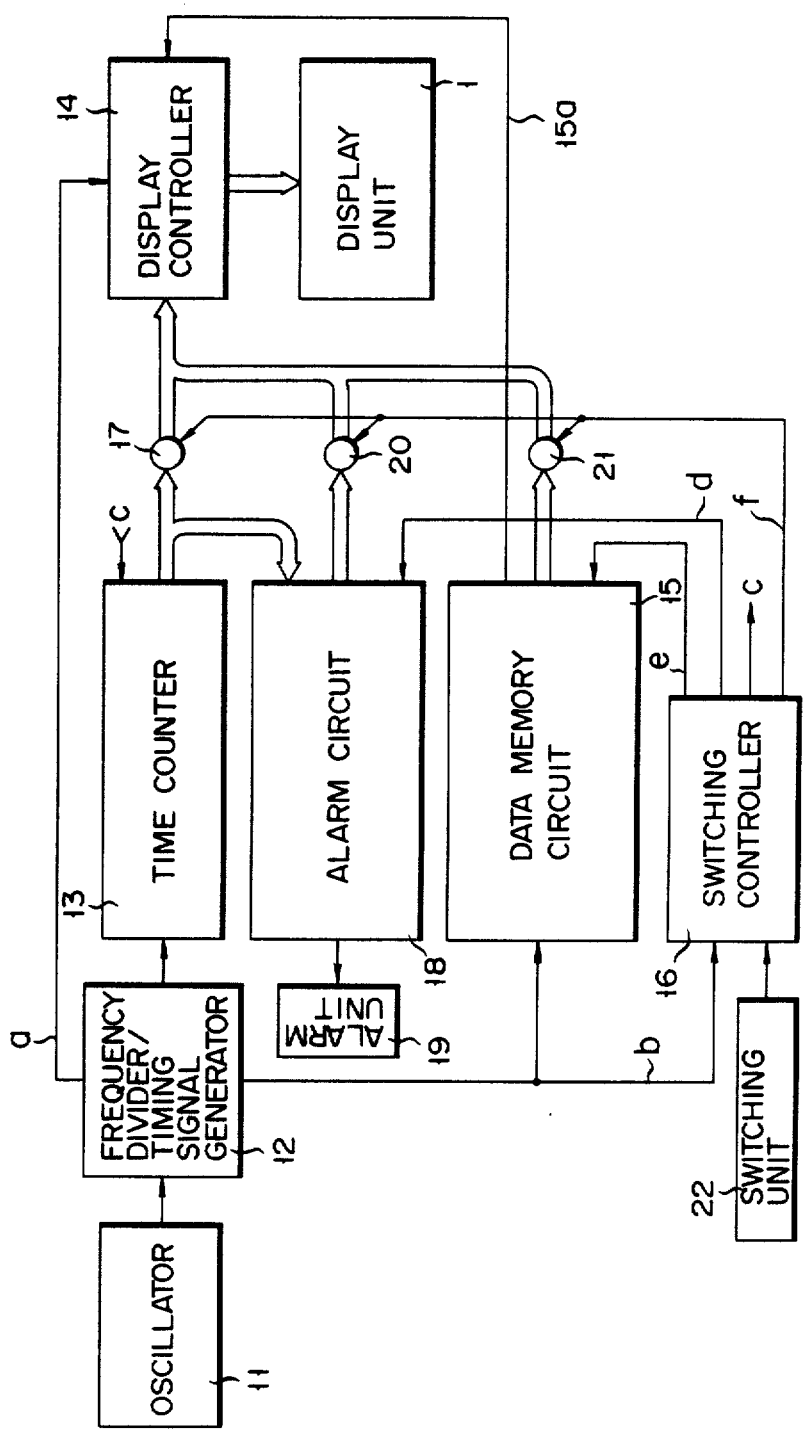
FIG. 3 is a block circuit diagram of the electronic wristwatch shown in FIG. 1.

A circuit configuration will be described hereinafter with reference to FIGS. 3 to 5. FIG. 3 is a block circuit diagram of the overall electronic watch. A reference clock signal generated from an oscillator 11 is supplied to a frequency divider/timing signal generator 12. The generator 12 supplies a 1P/1s signal (timing clock) to a time counter 13, and also supplies a display timing signal a to a display controller 14. Furthermore, the generator 12 supplies a timing signal b to a data memory circuit 15 and a switching controller 16. The time counter 13 counts the 1P/1s signal so as to obtain time data of hour, minute, second and date data of year, month and day. The time and date data obtained is supplied to the display controller 14 through a gate circuit 17 so as to be converted into display data. Thereafter, the display data is supplied to the display unit 1 and displayed. The time data obtained by the time counter 13 is also supplied to an alarm circuit 18. When the alarm circuit 18 detects the coincidence between preset alarm time data and the time data supplied from the time counter 13, it supplies an alarm signal to an alarm unit 19, thereby generating an alarm. The alarm time data is supplied to the display controller 14 through a gate circuit 20 so as to be converted into display data. The display data is thereafter supplied to the display unit 1 to be displayed thereon. The data memory circuit 15 can store name and telephone number data. Data read out from the data memory circuit 15 is supplied to the display controller 14 through a gate circuit 21 to be converted into display data, and thereafter is supplied to the display unit 1 to be displayed thereon. When the circuit 15 is selected, a signal 15a is generated from the circuit 15 as a display control signal and is supplied to the display controller 14 as will be described later. The switching controller 16 receives a switching signal generated from the switching unit 22 having the above-mentioned switches S1 to S6. The controller 16 supplies a time correction signal c, an alarm setting signal d, and a data set/read signal e to the counter 13, the alarm circuit 18 and the data memory circuit 15, respectively. The controller 16 also supplies a gate control signal f to the gate circuits 17, 20 and 21 so as to selectively enable them.

Figure 4:
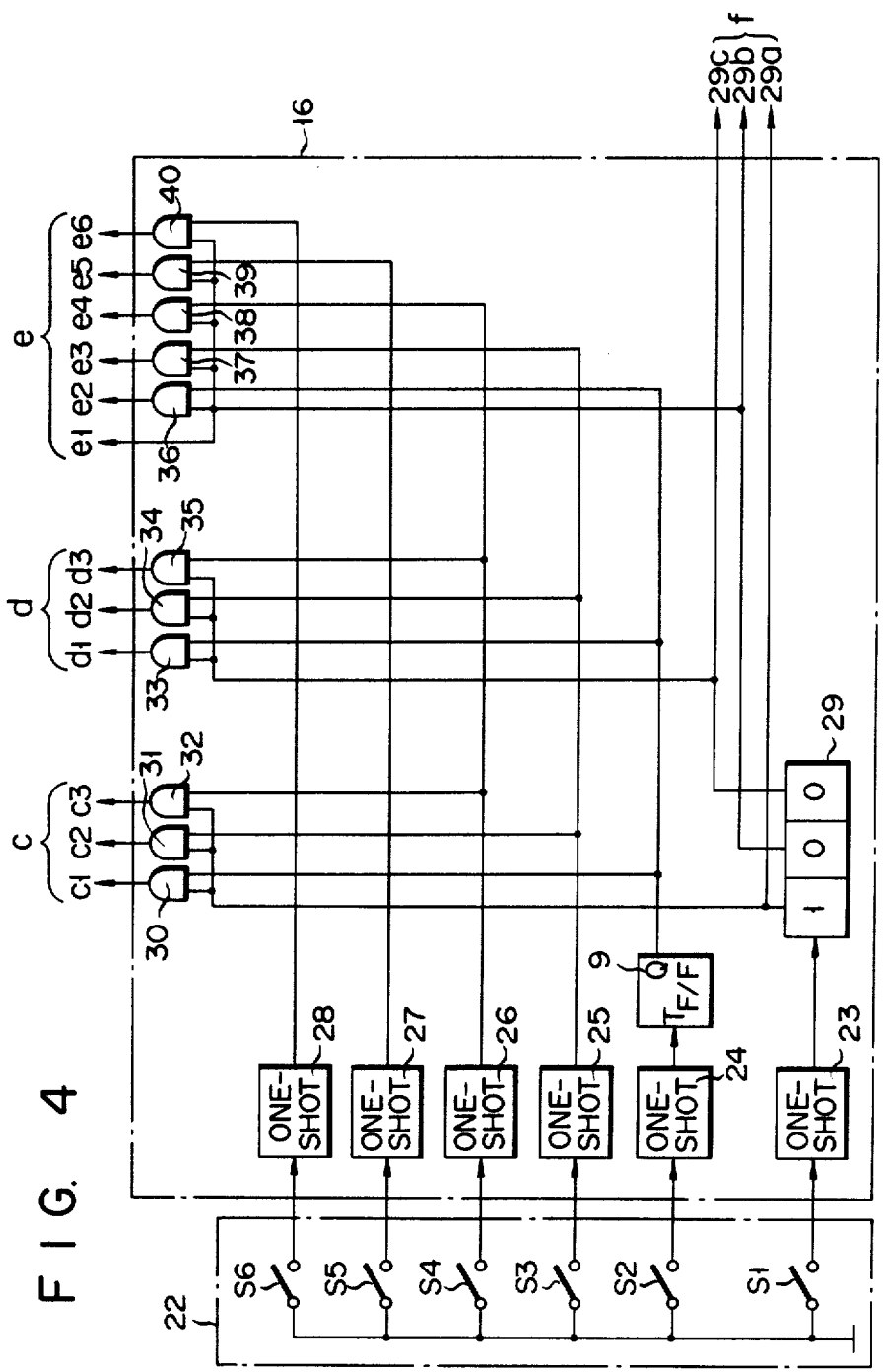
FIG. 4 is a block circuit diagram showing in detail a switching unit 22 and a switching controller 16 shown in FIG. 3.
Figure 5:
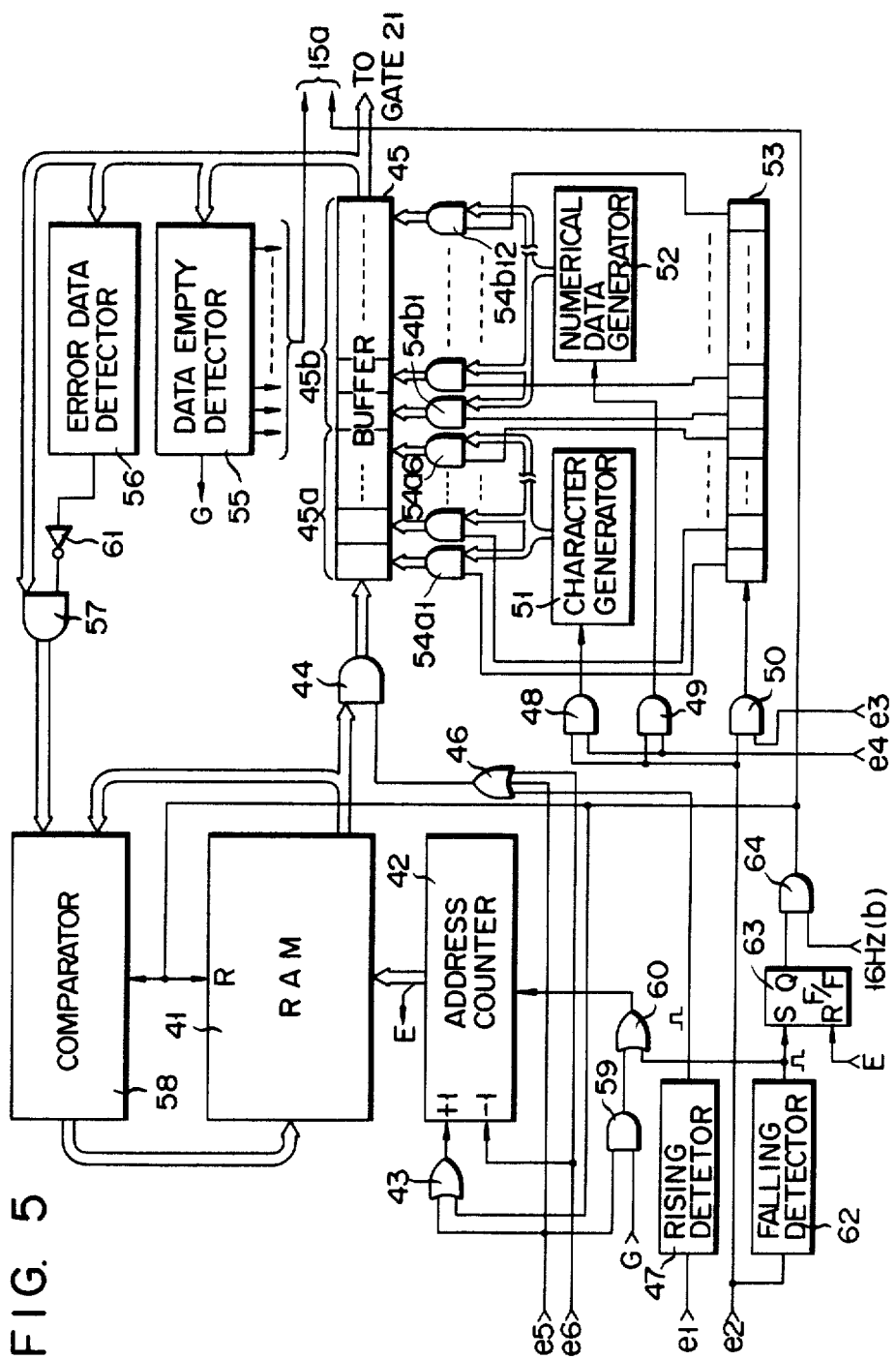
FIG. 5 is a block circuit diagram showing in detail a data memory 15.

FIG. 4 shows a configuration of the switching unit 22 and the switching controller 16 in detail. In the switching unit 22, the switch S1 is a mode switch for selectively switching a timepiece mode for displaying a content of the counter 13, a telephone number display mode for displaying a content of the data memory circuit 15, and an alarm time display mode for displaying a content of the alarm circuit 18. The switch S2 is provided for setting or releasing a correction (set) mode of the data in the above three modes. The switch S3 is a digit selection switch for selecting digits to be corrected or set in the correction (set) mode. The switch S4 is an increment switch for incrementing a content of the selected digit by one. Furthermore, the switches S5 and S6 are used for sequentially accessing name and telephone number data stored in the data memory circuit 15 in the telephone number display mode. The switch S5 is a +1 switch for accessing forward, i.e., accessing the next telephone number data. The switch S6 is a (−1) switch for accessing backward, i.e., accessing the previous telephone number data. Thus, outputs from the switches S1 to S6 cause corresponding one-shot circuits 23 to 28 in the switching controller 16 to generate pulse signals. The pulse signal from the circuit 23 is supplied to a mode selector 29. The selector 29 selects one of the timepiece mode, the telephone number display mode and the alarm time display mode in correspondence with bits 1 to 3 of the signal. Thus, the selector 29 generates one of the signals 29a to 29c as the gate control signal f so as to enable one of the gate circuits 17, 20 and 21. A bit 1 output from the selector 29 is supplied to AND gates 30 to 32, a bit 2 output is supplied to AND gates 36 to 40, and a bit 3 output is supplied to AND gates 33 to 35, respectively. A pulse signal from the one-shot circuit 24 is supplied to a T input terminal of a trigger flip-flop (T-FF) 9 and its output is inverted. A Q output of the T-FF 9 is supplied to the AND gates 30, 33 and 36. Furthermore, an output pulse from the one-shot circuit 25 is supplied to the AND gates 31, 34 and 37, an output pulse from the one-shot circuit 26 is supplied to the AND gates 32, 35 and 38, an output pulse from the one-shot circuit 27 is supplied to the AND gate 39 and an output pulse from the one-shot circuit 28 is supplied to the AND gate 40. The outputs from the AND gates 30 to 32 are the time correction signals c described above. An output c1 from the AND gate 30 is a signal for enabling the time correction state, an output c2 from the AND gate 31 is a digit selection signal and an output c3 from the AND gate 32 is a correction signal for incrementing a content of the selected digit. Similarly, the outputs from the AND gates 33 to 35 are the alarm set signals d described above. An output d1 from the AND gate 33 is a signal for enabling the alarm setting state, an output d2 from the AND gate 34 is a digit selection signal, and an output d3 from the AND gate 35 is a set signal for incrementing a content of the selected digit. The outputs from the AND gates 36 to 40 and the bit 2 output from the mode selector 29 are data set/read signals e. The bit 2 output e1 from the mode selector 29 is a data read signal in the telephone number display mode, an output e2 from the AND gate 36 is a signal for enabling the setting of the name and telephone number data, an output e3 from the AND gate 37 is a digit selection signal, an output e4 from the AND gate 38 is a set signal for incrementing a content of the selected digit, an output e5 from the AND gate 39 is a read signal for reading data forward, and an output e6 from the AND gate 40 is a read signal for reading data backward.

A configuration of the data memory circuit 15 will be described with reference to FIG. 5. A random-access memory (RAM) 41 constitutes the data memory and has a structure shown in FIG. 6. Each digit address region of the RAM 41 comprises a character data storing portion which can store six letters and a numerical data storing portion which can store 12 numerals. The name data is stored in the character data storing portion and the telephone number data is stored in the numerical data storing portion. A row address of the RAM 41 is designated by count data of an address counter 42, and data write/read operations are carried out with respect to the designated address. The address counter 42 consists of an up/down counter. When the signal e5 is supplied to the counter 42 through an OR gate 43, the count of the counter 42 is incremented by one, and when the signal e6 is supplied thereto, the count is decremented by one. The (name and telephone number) data read out from the RAM 41 is transferred to a buffer 45 through an AND gate 44. In this case, the AND gate 44 is enabled when the signal e5 or e6 is supplied thereto through an OR gate 46. The AND gate 44 is also enabled when the signal e1 is supplied to a rising detector 47 and a one-shot pulse generated synchronously with the rising of the signal e1 is supplied thereto through the OR gate 46. The buffer 45 can store name and telephone number data, and has a 6-digit character data storing portion 45a for storing the name data and a 12-digit numerical data storing portion 45b for storing the telephone number data. Thus, the data written in the buffer 45 is supplied to the display unit 1 through the gate circuit 21 to be displayed thereon.

The signal e2 enables AND gates 48 to 50 so as to allow the AND gates 48 and 49 to generate the signal e4 and the AND gate 50 to generate the signal e3, respectively. The output from the AND gate 48 is supplied to a character generator 51, and the output from the AND gate 49 is supplied to a numerical data generator 52. The generator 51 sequentially generates one of the letters "A" to "Z" every time the signal e4 is supplied from the AND gate 48. The generator 52 sequentially generates one of the numerals "0" to "9" every time the signal e4 is supplied from the AND gate 49. The output from the AND gate 50 is supplied to a digit selector 53. The selector 53 selects a digit of the buffer 45, and sequentially generates a digit selection signal every time the signal e3 is supplied from the AND gate 50 so as to enable one of the corresponding AND gates 54a1 to 54a6 and 54b1 to 54b12. The AND gates 54a1 to 54a6 correspond to respective digits in the character data storing portion 45a of the buffer 45 and transfer the character data generated from the character data generator 51 to the corresponding digits of the buffer 45. The AND gates 54b1 to 54b12 correspond to respective digits of the numerical data storing portion 45b of the buffer 45 and transfer the numerical data generated from the numerical data generator 52 to the corresponding digits of the buffer 45. Contents of the buffer 45 are supplied not only to a data empty detector 55 and an error data detector 56 but also to a comparator 58 through an AND gate 57. The detector 55 detects presence/absence of the data corresponding to the respective digits of the buffer 45, and generates a detection signal corresponding to each digit of the buffer 45 as the display control signal 15a mentioned above. When the display control signal 15a is supplied to the display controller 14, the controller 14 causes sub and main digital display portions 1A and 1B of the display unit 1 to display hyphens on the display digits corresponding to the data empty digits in the numeral data storing portion 45b of the buffer 45. When the detector 55 detects that none of the digits of the buffer 45 has data, it generates a signal G. The signal G enables an AND gate 59 which generates the signal e5 which is supplied to a clear terminal of the address counter 42 through an OR gate 60. The data error detector 56 checks if the data written in the buffer 45 is data of a predetermined format. The detector 56 detects the data of the predetermined format such as telephone number data which does not start "0" (in Japan, the telephone numbers start from "0"), name data which consists of six "A"s, and the like. When error data is detected, the detector 56 generates a signal of high level (logic level "1") which is supplied to the AND gate 57 through an inverter 61.

The signal e2 is also supplied to a falling detector 62. The falling detector 62 generates a one-shot pulse in synchronism with the falling of the signal e2. The output pulse from the detector 62 is supplied to the clear terminal of the address counter 42 through the OR gate 60 and is also supplied to an S input terminal of a SR flip-flop (SR-FF) 63. A Q output from the SR-FF 63 enables an AND gate 64 which generates a signal of 16 Hz. The 16-Hz signal from the AND gate 64 is supplied to the address counter 42 through the OR gate 43, thereby incrementing a content thereof by one. The 16-Hz signal is supplied to the RAM 41 as a read command signal and is supplied to the comparator 58 as an operation command signal. The comparator 58 compares the data sequentially read from the RAM 41 with the data from the buffer 45, in accordance with the 16-Hz signal. In this case, the comparator 58 compares six-character name data from the RAM 41 with that from the buffer 45 so as to sort the content of the RAM 41 into alphabetical order. In other words, the comparator 58 performs an edit operation so that names are sorted into those having "A" as the first character and those having "Z" as the first character. In the case of names having the same first character, they can be sorted into alphabetical order from the second character. For this reason, when data from the buffer 45 has a lower alphabetical order than that from the RAM 41, the comparator 58 transfers the data to the RAM 41 again. When the comparator 58 detects the data from the buffer 45 having the upper alphabetical order than that from the RAM 41, it transfers the data to the RAM 41. When the content of the address counter 42 is at the final address, an end signal E is supplied to an R input terminal of the SR-FF 63. The 16-Hz signal from the AND gate 64 is supplied to the display controller 14 as the display control signal 15a as described above. In this case, the display controller 14 makes the matrix display portion 1A of the display unit 1 perform a predetermined display representing the edit operation.

Figure 7A:
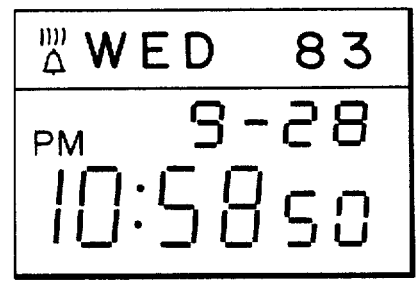
FIGS. 7A to 7C are representations for explaining changes in the display states of the display unit by the operation of a switch S1.
Figure 7B:
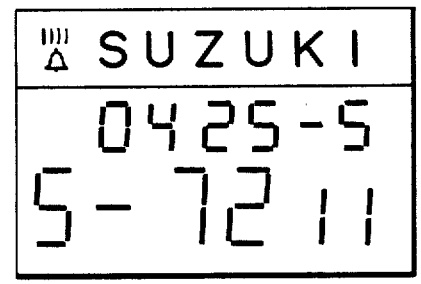
Figure 7C:
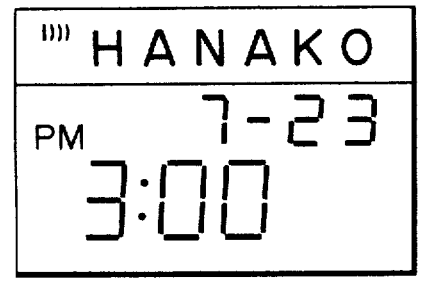

Operation of the above embodiment will be described hereinafter. FIGS. 7A to 7C are views showing changes in display states in accordance with the operation of the switch S1. When a signal 29a is generated from the mode selector 29, since the gate circuit 17 is enabled, the content of the counter 13 is supplied to the display unit 1 to be displayed. In this manner, in the timepiece mode in which the content of the counter 13 is displayed on the display unit 1, a current time, for example, Sept. 28th, 1983, Wednesday, 10 (hours): 58 (minutes) 50 (seconds) PM as shown in FIG. 7A is displayed on the display unit 1. In the normal timepiece mode, when the switch S1 is depressed once, the mode selector 29 genereates a signal 29a, thereby enabling the gate circuit 20. Thus, the display mode is switched to the telephone number display mode in which the data read out from the data memory circuit 15 is displayed. In the telephone number display mode, the switching controller 16 generates the signal e1 which is supplied to the data memory circuit 15. Then, in the circuit 15, the rising detector 47 generates the one-shot pulse in synchronism with raising the signal e1, thereby enabling the AND gate 44. As a result, the data from the RAM 41 designated by the address counter 42 is written in the buffer 45, and thereafter is supplied to the display unit 1 through the gate circuit 21 so as to be displayed, e.g., as shown in FIG. 7B. The name data of 6 characters is alphabetically displayed on the 6-digit matrix display portion 1A, and the telephone number data is digitally displayed on the sub and main digital display portions 1B and 1C of 12 digits. In this case, when the desired name data cannot be obtained, the switch S5 or S6 is depressed. Since the RAM 41 stores the name data in alphabetical order, it is determined that if the desired name data is stored after or before the current displayed name data with reference thereto. If the desired name data is stored after the current name data, the switch S5 is operated, and if before the current data, the switch S6 is operated. In the telephone number display mode, when the switch S5 or S6 is operated, the switch controller 16 generates the signal e5 or e6 in response to the operation of the corresponding switch so as to increase or decrease the content of the address counter by one and to enble the AND gate 44. Thus, the subsequent or preceding telephone number data is read out from the RAM 41 and is displayed. Every time the switch S5 or S6 is operated, the address of the RAM 41 is increased or decreased by one and the subsequent or preceding telephone number data is sequentially displayed. Therefore, the switch S5 or S6 is operated until the desired name data is displayed. When the next address of the RAM 41 is designated by operating the switch S5 and when the address at which no data is stored (empty address) is designated first, the data empty detector 55 detects that all the digits have no data and generates the signals 15a and G in response to this. As a result, hyphens are displayed on all the digits (12 digits) of the sub and main digital display portions 1B and 1C, as shown in FIG. 8A. Simultaneously, the AND gate 59 is enabled by the signal G. In this state, when the switch S5 is depressed once more, the address counter 42 is cleared to "00000". As a result, the start address of the RAM 41 at which the character and numerical data of, e.g., "AOKI 0552-41-6828" is stored is designated. Therefore, since the first page at which the data is stored is displayed after the hyphens are displayed on all the display digits (i.e., empty page display), the empty page display can serve to clearly divide the first and last pages.

In the telephone number display mode, when the switch S1 is depressed once, the mode selector 29 generates the signal 29c so as to enable the gate circuit 20. Thus, the alarm time data and the message data for the alarm time are read out from the alarm circuit 18 and are displayed. FIG. 7C shows the display state in the alarm time display mode. When the switch S1 is depressed once more, the display mode returns to the timepiece mode, as shown in FIG. 7A.

The operation for setting or correcting the telephone number data will be described. In the telephone number display mode, the switch S2 is operated so as to set the T-FF 9 of the switching controller 16. Since the controller 16 generates the signal e2, the AND gates 48 to 50 are respectively opened in the data memory circuit 15. In this state, when the switch S3 is depressed first, the content of the digit selector 53 is updated by the signal e3. After selecting the digit to be set, when the switch S4 is operated, the signal generated in response to the operation of the switch S4 is supplied to the character data generator 51 and the numerical data generator 52. Assuming that the first to sixth digits of the buffer 45 are selected, one of characters "A" to "Z" is written in alphabetical order in one of the selected digits every time the switch S4 is operated. Assuming that the seventh to 18th digits are selected, one of the numerals "0" to "9" is written in one of the selected digits every time the switch S4 is operated. In this case, since the data written in the buffer 45 is sequentially displayed, the display content can be visually observed. So, the switch S4 can be depressed until the desired character or numeral data is displayed. The data written in the buffer 45 is supplied to the data empty detector 55 which checks the presence/absence of the data. Thus, the signal 15a corresponding to the data empty digit is generated and is supplied to the display controller 14. Now assuming that the telephone number data is being written and the last two digits are not set, hyphens are displayed on the digits corresponding to the data empty digits, as shown in FIG. 8B. In this manner, a user can confirm that the last two digits must be set. Before setting the telephone number data in the buffer 45, since hyphens are displayed on all the digits of the digital display portions in the same manner as in the empty page display of FIG. 8A, the number and positions of the digits to be set are clear. This results in convenience when data such as telephone number data is set to be divided at predetermined positions or when the data is set to be divided at predetermined digits so as to allow easy reading at a later time.

In this manner, when setting the operation of the data in the buffer 45 is completed, the switch S2 is operated again. The output of the T-FF 9 is inverted and the signal e2 goes to the low level (logic level "0"). As a result, since the one-shot pulse is generated from the falling detector 62, the content of the address counter 42 is cleared to "00000", thus designating the start address of the RAM 41. Simultaneously, the SR-FF 63 is set so as to enable the AND gate 64. Thus, the AND gate 64 generates a 16-Hz signal which is supplied to the RAM 41, the address counter 42 and the comparator 58. The comparator 58 compares the data sequentially supplied from the start address of the RAM 41 with the data from the buffer 45, and executes the edit operation so as to sort the content of the RAM 41 into alphabetical order in accordance with the comparison result. The content of the RAM 41 is sorted into name data having "A" as the first character to that having "Z" as the first character, and in the case of the name data having the same first character, they can be sorted into alphabetical order from the second character. In other words, every time new data is inputted, the RAM 41 is editted. During the edit operation, since the 16-Hz signal from the AND gate 64 is supplied to the display controller 14, "SET-A" is, for exmaple, displayed on the matrix display portion 1A of the display unit 1, as shown in FIG. 1. In this case, one letter is displayed next to a hyphen in the order of "A" to "Z" in accordance with the 16-Hz signal. During the edit operation, when the content of the address counter 42 reaches the final address of the RAM 41 and the end signal E is thus generated, the SR-FF 63 is reset. In this manner, the edit operation is stopped in response to the signal E.

Before executing the edit operation described above, the error data detector 56 checks if the format of data written in the buffer 45 coincides with a preset given format. When the detector 56 detects coincidence between them, the output therefrom becomes "0" and the output from the inverter 61 thus becomes "1", thereby enabling the AND gate 57. The data written in the buffer 45 is supplied to the comparator 58 and is written in the RAM 41 in accordance with the above-mentioned edit operation. On the other hand, when the detector 56 detects error data, the output therefrom becomes "1", thus disabling the AND gate 57. Even when the above edit operation is performed, the error data cannot be written in the RAM 41 and is ignored.

In the above embodiment, the telephone number data is stored in the data memory. However, the data can be street address data, schedule data and the like and can be changed as needed. In the above embodiment, the timepiece mode, the alarm time mode and the telephone number display mode are switched by operating the switch S1. However, a plurality of telephone number display modes and corresponding data memory circuits 15 can be provided so as to perform the operation in the above embodiment. For example, telephone number display modes A and B can be switched by a switch so that a data memory corresponding to the telephone number display mode A stores business telephone number data and another data memory corresponding to the telephone number display mode B stores private telephone number data. In both the display modes, the above-mentioned operation can be performed. In this case, the data memory for the display modes A and B can be configurated by a single RAM.

The data input means is not limited to a push-button switch. For example, the data input means can be a touch switch formed on a glass surface of a wristwatch which is touched so as to manually write a desired character with a finger.

In the above embodiment according to the present invention, various circuits comprise hardware. However, various functions can be controlled by a microprogram stored in a read-only memory (ROM), and functions other than the above-mentioned ones can be provided. Another embodiment of the present invention will be described hereinafter. Note that the same reference numerals as in the above embodiment denotes the same parts in this embodiment, and a detailed description thereof is omitted.

FIG. 9 shows the overall circuit configuration. A reference frequency signal generated by an oscillator 107 is frequency-divided by a frequency divider 108 and is supplied to a timing signal generator 109. Various basic timing signals generated by the generator 109 are supplied to a ROM 110, a RAM 111, a command decoder 112 and an address counter or controller 113 so as to drive them.

The ROM 110 stores microprograms for controlling the overall operation of this electronic wristwatch. Each microprogram is read from an area of the ROM 110 whose address is designated by the address controller 113 so as to be executed. Operation code data of the read program is supplied from a terminal OP of the ROM 110 to the command decoder 112, and numerical value and address data thereof are supplied from a terminal D0 of the ROM 110 to an address input terminal Addr of the RAM 111, the address controller 113, and an input terminal D12 of a calculation unit 114 through a data bus. The next address data is supplied to the address controller 113.

The decoder 112 decodes the operation code data and supplies a read/write control signal to the RAM 111. The decoder 112 also supplies a calculation command to the calculation unit 114. The data read from a terminal D0 of the RAM 111 is supplied to terminals D11 and D12 of the calculation unit 114. The calculation unit 114 calculates in accordance with the current calculation command. The calculation data is supplied to a terminal DI of the RAM 111 and is written therein. A "0" signal and a carry signal generated by the calculation unit 114 are supplied to the address controller 113 so as to change an access address of the ROM 110 in accordance with the calculation result of the unit 114. A 32-Hz timing clock generated from the frequency divider 108 is also supplied to the address controller 113. In response to this, the controller 113 supplies the address data for reading a program of a timing flow executed every 1/32 seconds, and the calculation unit 114 calculates to obtain new timing data in response thereto. The unit 114 supplies the calculation result to the RAM 111.

The data read from the RAM 111 is supplied to a decoder 115 so as to be converted into display data and is displayed on the same display unit 1 as that shown in FIG. 2. An input unit 116 comprises switches S3, S5, S6, S4, S2 and S1 and input data from these switches are written in the RAM 111 through a data bus.

Figure 10:
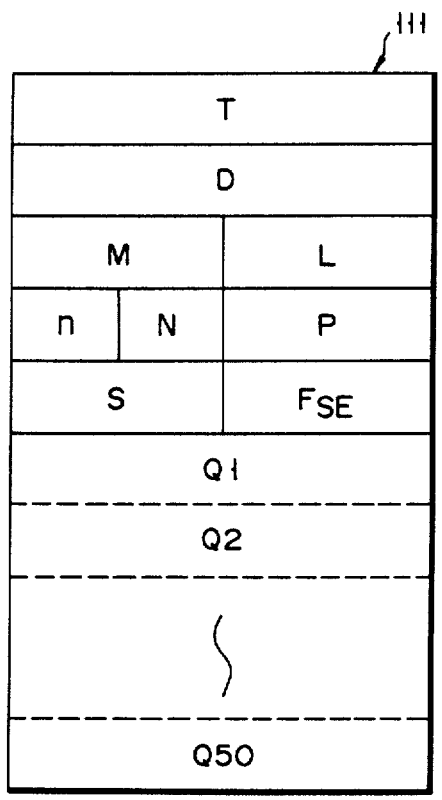
FIG. 10 is a view of an arrangement showing a RAM 111 in FIG. 9.
Figure 11:
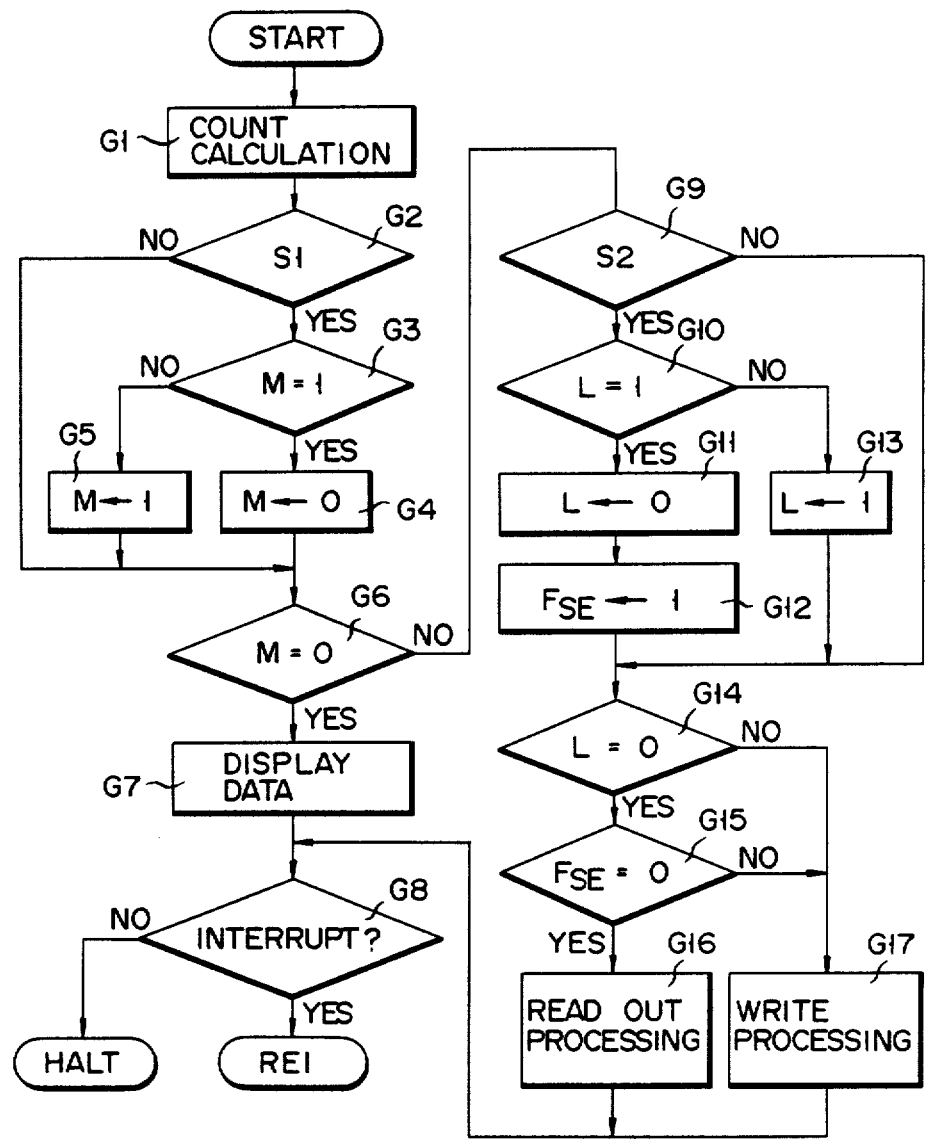
FIG. 11 is a general flow chart of the circuit shown in FIG. 9.

FIG. 10 shows the memory map of the RAM 111. As shown in FIG. 10, the RAM 111 comprises at least T, D, M, L, n, N, P, S and $F_{SE}$ registers and data storing page registers Q1 to Q50. Time data or date data is stored in the T and D registers in the timepiece mode. The M register is a flag register in which "0" is set in the timepiece mode and "1" is set in the memory mode. The L register is also a flag register in which "0" is set in the read out mode and "1" is set in the write mode. The n register stores the number of pages (the number of registers) in which data is stored. The N register stores the maximum number of pages which can be stored The number of display pages is set in the P register. The uppermost page of the set pages is set in the S register. The $F_{SE}$ register is a flag register used for editing. Data such as telephone number data is set in the registers Q1 to Q50, and the number of registers corresponds to the number of pages. In this case, in each page, letters (characters) up to 6 digits and numerals up to 12 digits can be set.

Operation of this embodiment will be described with reference to FIGS. 11 to 15. The overall operation will first be described with reference to a general flow of FIG. 11 and representions of FIG. 14. When the calculation unit 114 supplies the 32-Hz signal to the address controller 113, the controller 113 reads a count program from the ROM 110 to cause the calculation unit 114 to perform the count calculation (step G1). In this case, the preceding time and date data are read out from the T and D registers of the RAM 111 and predetermined values are respectively added thereto. Thus, the current time and date data are set in the T and D registers.

After completing the count processing, it is checked if the switch S1 for switching the timepiece mode or the memory mode has been operated (step G2). If NO in step G2, the flow jumps to step G6 and it is checked if the data of the M register is "0". If YES in step G6, this means the device is in the timepiece mode and the display processing of step G7 is performed. Then, as shown in A in FIG. 14, the data of the T and D registers are supplied to the display unit 1 so as to display the time and date. Thereafter, it is checked if an interrupt processing signal has been given (step G8). If YES in step G8, interrupt processing is executed, and if NO in step G8, the device is set in the stand-by mode until the next general flow execution.

Figure 14:
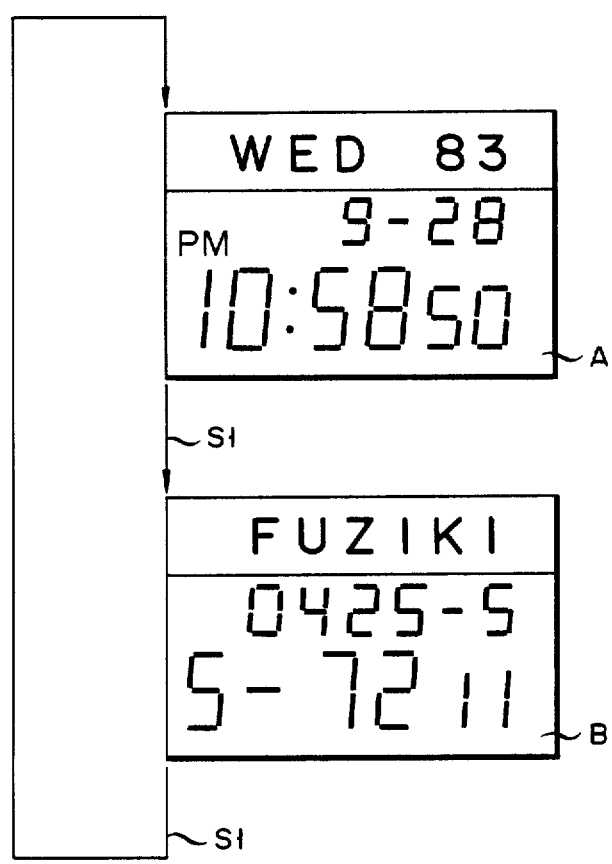
FIG. 14 is a representation showing changes in display states on the display unit in accordance with a switching operation between timepiece and memory modes.

On the other hand, if YES in step G2, the flow advances to step G3 and it is checked if the data of the M register is "1". If YES in step G3, this means the device is in the memory mode, and the flow advances to step G4. In step G4, flag "0" is set in the M register so as to set the timepiece mode. If NO in step G3, this means the device is in the timepiece mode, and the flow advances to step G5. In step G5, flag "1" is set in the M register so as to set the memory mode. Then, the flow advances to the display processing of steps G6 and G7. Thus, as shown in FIG. 14, when it is the display shown in reference symbol A in the timepiece mode and the switch S1 is then operated, it is changed to the display shown in reference symbol B in the memory mode so as to display the telephone number. If the display is indicated in reference symbol B in the memory mode and the switch S1 is then operated, the display mode is switched to the timepiece mode.

If M is not "0" in step G6, i.e., if the memory mode is set, the flow advances to step G9, and the write or read mode is switched. In step G9, it is checked if the switch S2 has been operated. If NO in step G9, the flow jumps to step G14, and it is checked if the L register is "0". If YES in step G14, this means the device is in the read out mode, and the flow advances to step G15. In step G15, it is checked if the $F_{SE}$ flag register for editing is "0". If YES in step G15, the read processing (step G16) is executed, and thereafter the flow advances to step G8. On the other hand, if NO in step G15, the write processing (step G17) is executed and thereafter the flow advances to step G8.

If NO in step G15, this means the device is in the write mode, and the flow advances to step G17 so as to execute write processing.

Figure 12A:
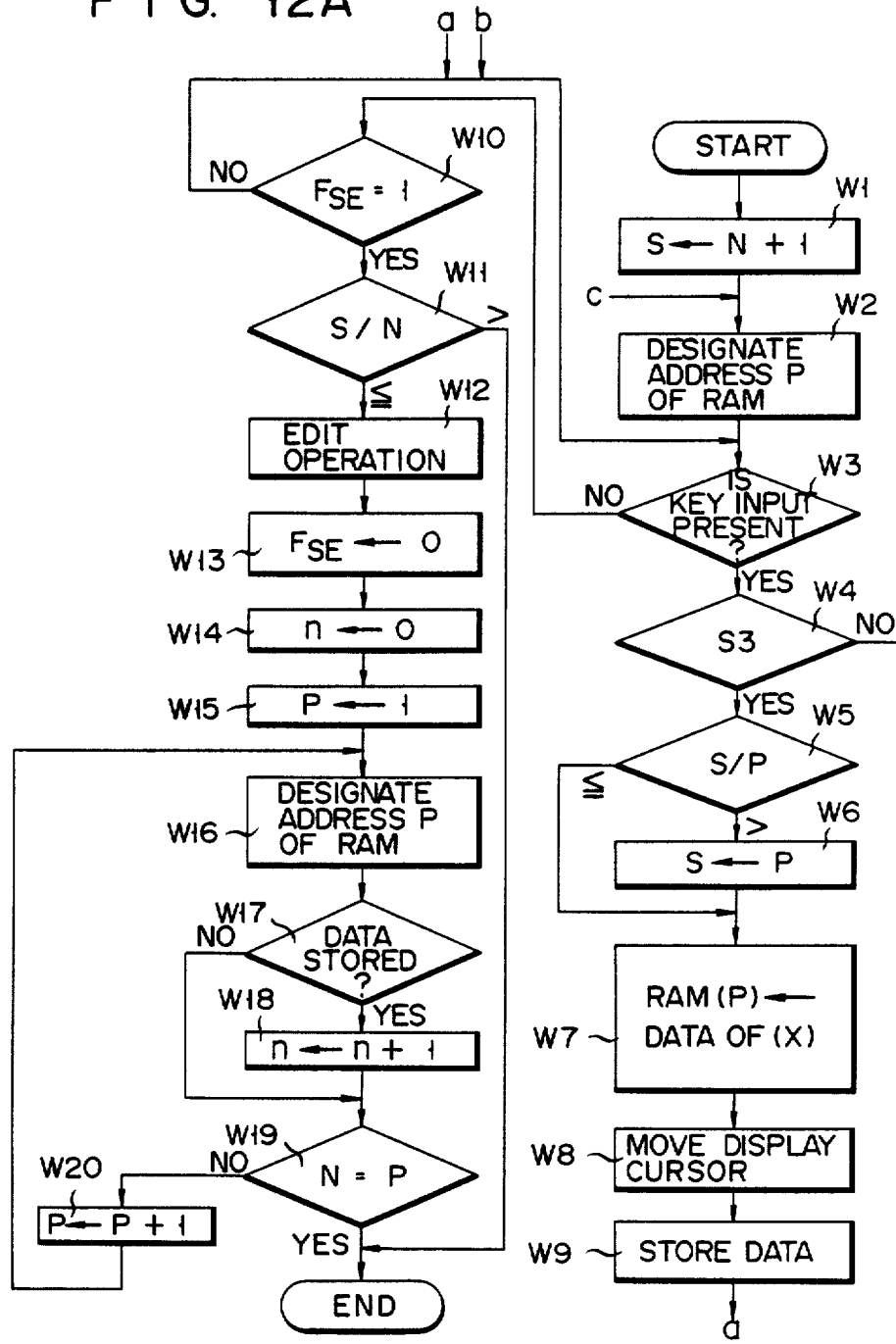
FIGS. 12A and 12B together show a flow chart of a write operation in the circuit shown in FIG. 9.
Figure 12B:
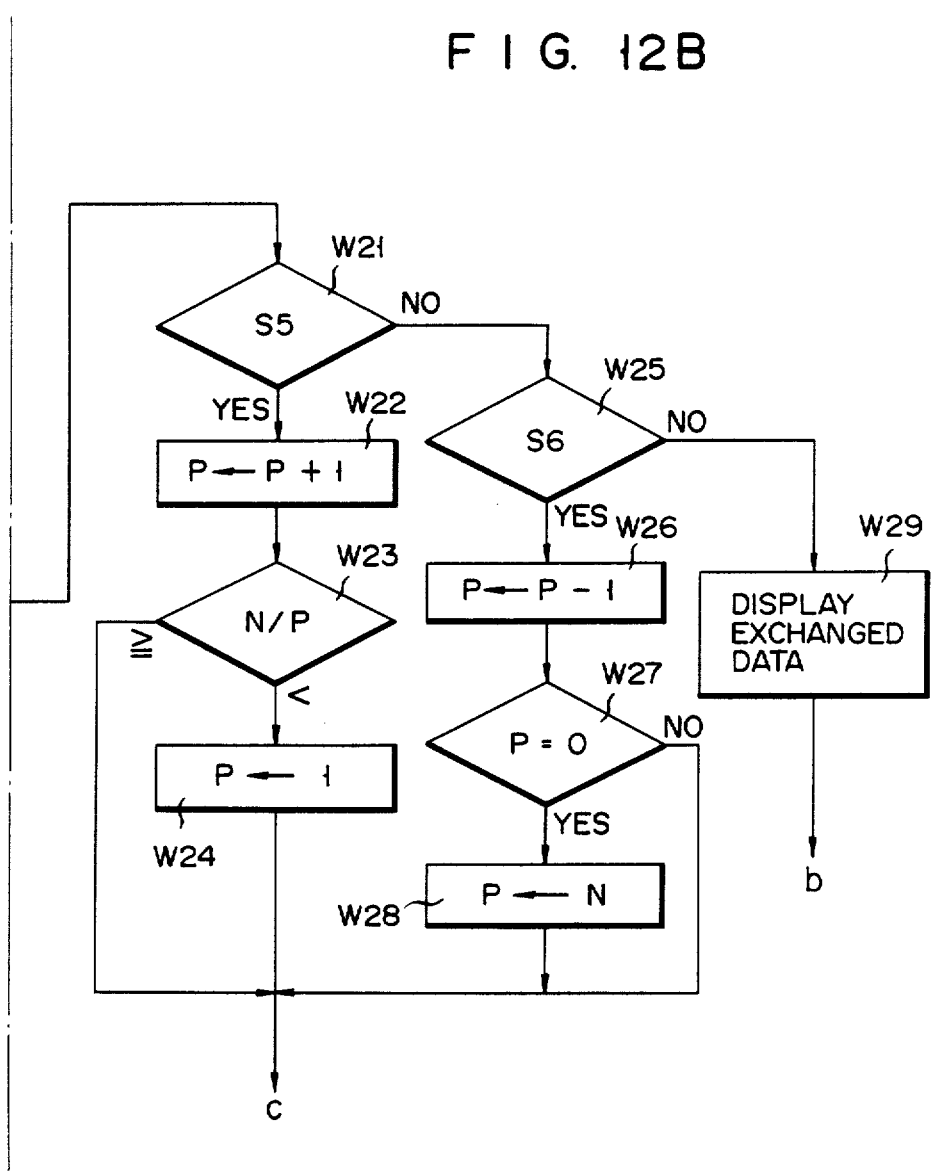
Figure 15:
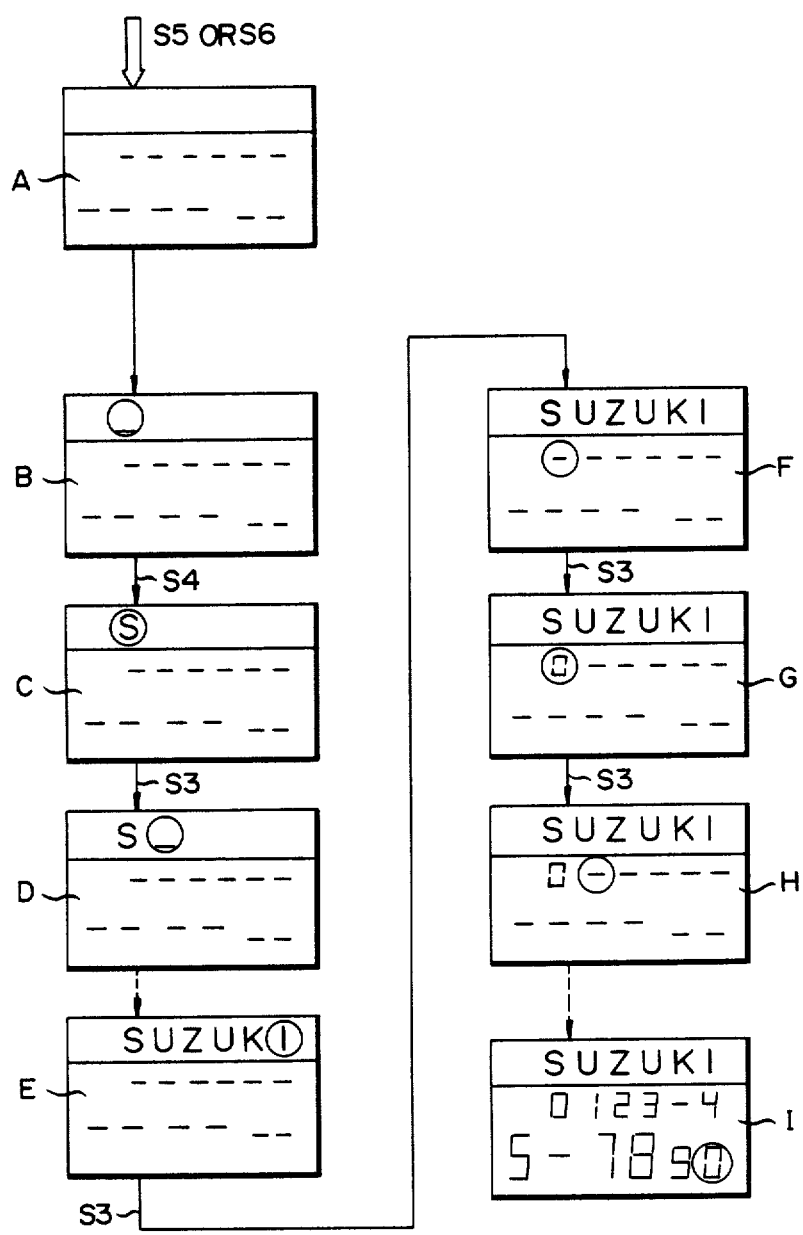
FIG. 15 is a representation showing changes in display states on the display unit in the write mode.

Operation of the write processing in step G17 will be described with reference to FIGS. 12 and 15. When the data is written, the switch S5 or S6 is operated so as to search the data storing registers Q1 to Q50 in the positive or negative direction, thereby finding an area having no data. In this case, in step W1, data "51" which is obtained by adding +1 to data "50" of the N register storing the maximum page number "50" is set in the S register.

An address of the RAM 111 is designated by the data of the P register in which the current display page is set (step W2). The presence of a key input is checked in step W3. When the switch S5 or S6 is operated, the flow advances to step W4 and it is checked if the switch S3 is operated. If NO in step W4, the flow advances to step W21 and it is checked if the switch S5 is operated. If YES in step W21, the flow advances to step W22 and the P register is incremented by 1 so as to advance the register by one page. In step W23, the data "50" is compared with the data of the P register. If N≧P, the flow returns to step W2. On the other hand, if N<P, this means that the current page number exceeds fifty, and therefore the flow advances to step W24. In step W24, flag "1" is set in the P register, and the display page is returned to the first page. Then, the flow returns to step W2.

On the other hand, when the switch S6 is operated, the flow advances from step W21 to step W25 and it is checked if the switch S6 is operated. If YES in step W25, the P register is decremented by one page in step W26. Then, it is checked if the data of the P register is "0", i.e., if the display page is the 0th page (step W27). If NO in step W27, the flow returns to step W2 and if YES in step W27, the data "50" of the N register is set in the P register so as to set the fiftieth page. Then, the flow returns to step W2.

When the switch S5 or S6 is operated, the data is read out from the register corresponding to the page represented by the data of the P register which is incremented or decremented by 1 and is displayed on the display unit 1. When the switch S5 or S6 is repeatedly operated and the display which represents that no data (telephone number) is written in the current page of the P register as shown in A in FIG. 15, the operation of the switch S5 or S6 is stopped. As a result, as shown in B in FIG. 15, a cursor is displayed on the first digit of the character display portion 1A (referring to FIG. 2). In this state, when the switch S4 is operated once, the letter "A" is automatically displayed on the first digit. In this case, it is checked if the switch S4 is operated, in steps W3, W4, W21 and W25, and the letter "A" is displayed by the processing in step W29. Then, the flow returns to step W3.

In an input operation of telephone numbers, a family name or an abbreviation with six characters is set in the character display portion 1A and an actual telephone number is set in the numeral display portions 1B and 1C. Assuming that the family name of "SUZUKI" and the telephone number of "0123-45-7890" are set, the switch S14 is continuously operated until the first letter "S" is displayed in the alphabetical order. As shown in C in FIG. 15, when the letter "S" is displayed, the switch S3 for inputting this letter is operated.

At this time, it is checked if the switch S3 is operated in step W4. In step W5, the data in the S and P registers are compared. When S>P, the data of the current display page of the P register is set in the S register (step W6), and the data "S" is transferred to the current page register in the RAM 111 (step W7). Then, as shown in D in FIG. 15, the cursor is moved to the second digit (step W8), and the data "S" is stored in the current page register. The flow then returns to step W3.

Other letters "SUZUKI" can be inputted by the operation of the switches S4 and S3, in the same manner as described above. As shown in reference symbol E in FIG. 15, when the last letter "I" is inputted and is stored by the switch S3, the cursor as shown in reference symbol F in FIG. 15 is moved to the first digit of the upper column of the numeral display portion 1B. Thereafter, every time the switch S4 is operated, numerals are displayed as 0, 1, . . . , 9 in the order named. Thus, when the desired numeral is displayed, the switch S3 is operated so as to store it in the current page register. G, H and I in FIG. 15 illustrate the input operation. When the data for one page has been inputted, the next page is designated by the switch S5 or S6 and the data is stored in the same manner as described above.

In this manner, when the desired number of data have been stored in the data storing registers Q1 to Q50 in the RAM 111, no key operation is needed. Then, the flow advances from step W3 to step W10. In step W10, it is checked if the flag $F_{SE}$ is "1". Flag $F_{SE}$ is set at "1" because the write processing is being executed. For this reason, the flow advances to step W11, and the data of the S register is compared with the data "50" of the N register. In this case, if the input operation is being carried out, the relation S≦N is always established. Therefore, the edit operation of step W12 is executed. However, if the input operation is not performed, S>N is established from the processing of step W1 and the write processing ends.

In the edit operation of step W12, 6-character data in the respective data storing registers Q1 to Q50 are sorted into alphabetical order. When this operation ends, flag $F_{SE}$ is set at "0" in step W13, and the operation from step W14 to step W20 is repeatedly performed so that the actual data number in the RAM 111, i.e., the number n of the registers used among the registers Q1 to Q50 is calculated.

In steps W14 and W15, data "0" is set in the n register and data "1" is set in the P register. A Pth page, i.e., the first page of the RAM 111 is designated (step W16) and it is checked if the data is stored therein (step W17). If YES in step W17, the n register is incremented by 1. If NO in step W17, the flow jumps to step W19. It is checked in step W19 if the data of the P register is equal to the data "50" of the N register, i.e., the retrival operation of data is performed to the fiftieth page. The flow advances to step W20 until the fiftieth page is reached and the P register is incremented by 1 so as to designate the next page. In this manner, steps W16 to W20 are repeated 50 times so as to obtain the number n of the registers used. When N=P, the flow ends.

Operation of the read processing of step G16 will be described with reference to FIGS. 13 and 16. In this case, when the data in the registers Q1 to Q50 are sequentially read so as to be displayed, the switch S5 or S6 is operated. On the other hand, when the number of registers used must be displayed, the switch S4 is continuously depressed.

For example assume that the switch S5 is operated. In step R1, it is checked if the switch S5 is operated. Since YES in step R1, the flow advances to step R2. In step R2, it is checked if the data of the n register (the number of the registers having data) is "0". If YES in step R2, since no data is stored in any data storing registers Q1 to Q50, the flow advances to step R7 and the data display processing of the current page is performed. In this case, since no data is stored in this page, hyphens representing a data empty state are displayed as shown in D in FIG. 16.

If NO in step R2, the flow advances to step R3, and the data of the P register is compared with the data of n register. If P<n, the flow advances to step R5, and the next page is designated so as to display the data thereof (step R7). If P=n, the flow advances to step R4, and it is checked if the data of the n register is equal to the data "50" of the P register, i.e., if all the registers Q1 to Q50 have the data. If YES in step R4, the flow advances to step R6 and the current display page is returned to the first page so as to display the data thereof (step R7). If NO in step R4, the flow advances to step R5 and the next page is designated, thus displaying the data thereof (step R7). Furthermore, if P>n in step R3, the flow advances to step R6 and the display page is returned to the first page, thus displaying the data thereof (step R7).

In this manner, every time the switch S5 is operated, steps R1 to R7 are selectively executed in accordance with the relationship between the current display page and the used register number of the n register so as to sequentially designate the pages, thus displaying the data thereof. In FIG. 16, the flow A, B, C, D, A, . . . , represents this operation. For example, assume that among the registers Q1 to Q50, the data is stored in the registers Q1 to Q20 and the page number of the P register is the third page when the read processing is started. First, the data of the third page is displayed, and every time the switch S5 is operated once, the data in the fourth, fifth, sixth, . . . , 19th, and 20th pages are sequentially displayed. When the page number reaches the 21st page in which no data is written, hyphens shown in D in FIG. 16 are displayed. Thus, the display page is returned to the first page and the data in the first, second, third, fourth, . . . 20th pages are displayed. In this manner, hyphens indicating the data empty state of the 21st page are displayed, and the display page is returned to the first page again.

Since the switch S6 is used for addressing the RAM 111 in the negative direction opposite to the case of the switch S5, the processing of steps R5 to R14 is obvious to those skilled in the art and a detailed description thereof is omitted.

In order to obtain the number of registers used, when the switch S4 is depressed, for example, "27/50" is displayed during the depression interval. Note that "27" represents the number of registers used and "50" represents the maximum page number.

When the switch S4 is depressed, the flow advances to step R15 through steps R1 and R3 and the depression thereof is checked. Thereafter, as shown in E in FIG. 16, the processing for displaying the number of registers used (step R16) is executed.

It should be noted that in the above embodiment, the used page number is displayed. However, the remaining page number can be displayed. In the above embodiment, when the latest data which is written in one of the data storing registers Q1 to Q50 is displayed, hyphens which represent the data empty state are displayed. Instead of this, for example, assuming that the data is stored in each of the registers Q1 to Q50 and the register 5 is first displayed when the memory mode is selected, the hyphen display such as 5, 6, 7, 8, 9, 10, 1, 2, 3, 4, hyphens, 5, and 6 can be performed. Furthermore, in the data edit operation, the order of data is not limited to the alphabetical order. The present invention can be applied not only to an electronic wristwatch but also to any small electronic equipment with a memory.

What is claimed is:

1. A portable electronic memorandum device, comprising:
    character data item input means for inputting character data items including at least character data;
    character data item-storing means for storing the character data items inputted by said character data item input means;
    operation switching means for sequentially designating the character data items in the character data item-storing means, and for sequentially reading out the character data items stored in the character data item-storing means in response to a switching operation;
    optical display means for sequentially displaying the character data items sequentially read out by said operation switching means;
    empty display control means for enabling a last character data item stored in said character data item-storing means to be displayed on said optical display means when operating said operation switching means, and for thereafter causing a display representing a data empty state to be indicated on said optical display means when operating said operation switching means; and
    first character data display control means for permitting a first character data item stored in said data item-storing means to be displayed on said optical dispaly means when operating said operation switching means after the data empty state is indicated by operation of said empty display control means.

2. A device according to claim 1, wherein said optical display means comprises means for displaying the number of character data items stored in said character data item-storing means.

3. A device according to claim 1, wherein said optical display means comprises means for displaying the number of character data items which can be stored in said character data item-storing means.

4. A device according to claim 1, wherein said character data item storing means includes means for storing the character data items in alphabetical order.

5. A device according to claim 1, comprising input control means for enabling said character data item input means to input a new character data item when the data empty state is indicated by operation of said empty display control means.

6. A device according to claim 5, comprising means for causing the data empty state display to be indicated again, after the new character data item has been input by use of said input control means.

7. A device according to claim 1, wherein said empty display control means includes means for enabling said optical display means to display hyphens to indicate the data empty state.

8. A device according to claim 1, comprising edit means for re-storing the plurality of the character data items which have been stored in said character data item-storing means, and a character data item newly inputted, in an order according to a predetermined format.

9. A device according to claim 8, comprising means for indicating that said edit means is operating.

10. A device according to claim 8, wherein said edit means comprises means for sorting and re-storing in alphabetical order, the plurality of the character data items stored in said character data item-storing means and the character data item newly inputted.

11. A portable electronic memorandum device, comprising:
characteristic data item input means for inputting character data items including at least character data;
character data item-storing means, having a plurality of address areas, for storing the character data items inputted by said character data item input means, in an order according to a predetermined format and including an address area which is empty of data;
operation switching means for sequentially designating the respective address areas in the character data item-storing means, and for sequentially reading out the character data items stored in the designated address areas in response to a switching operation;
optical display means for sequentially displaying the character data items sequentially read out by said operation switching means;
detecting means for detecting if the empty address area is designated after address areas corresponding to all character data items stored in the character data item-storing means are designated by operation of said operation switching means;
empty display control means for causing a display representing a data empty state to be indicated on said optical display means, on the basis of an output from said detecting means;
first character data display control means for permitting a first character data item stored in said data item-storing means to be displayed on said optical display means when operating said operation switching means after the empty state is indicated by operation of said empty display control means.

12. A device according to claim 11, wherein said character data item-storing means includes means for storing the character data items in the sequential address areas in alphabetical order.

13. A device according to claim 11, comprising input control means for enabling said character data item input means to input a new character data item when the data empty state is indicated by operation of said empty display control means.

14. A device according to claim 13, comprising means for causing the data empty state display to be indicated again, after the new character data item has been input by use of said input control means.

15. A device according to claim 11, wherein said empty display control means includes means for enabling said optical display means to display hyphens to indicate the data empty state.

16. A device according to claim 11, comprising edit means for re-storing the plurality of the character data items which have been stored in said character data item-storing means, and a character data item newly inputted, in an order according to said predetermined format.

17. A device according to claim 16, comprising means for indicating that said edit means is operating.

18. A device according to claim 16, wherein said edit means comprises means for sorting and re-storing, in alphabetical order, the plurality of the character data items stored in said character data item-storing means and a character data item newly-inputted.

19. A portable electronic memorandum device, comprising:
character data item input means for inputting character data items including at least character data;
character data item-storing means, having a plurality of address areas, for storing the character data items inputted by said character data item input means, in an order according to a predetermined format and including an address area which is empty of data;
operation switching means for sequentially designating the respective address areas in the character data item-storing means, and for sequentially reading out the character data items stored in the designated address areas in response to a switching operation;
optical display means for sequentially displaying the character data items sequentially read out by said operation switching means;
empty display control means for causing a last character data item stored in said character data item-storing means to be displayed on said optical display means when operating said operation switching means, and for thereafter detecting the empty address area and causing a display representing a data empty state to be indicated on said optical display means when operating said operation switching means again; and
first character data display control means for permitting a first character data items stored in said data item-storing means to be displayed on said optical display means when operating said operation switching means after the data empty state is indicated by operation of said empty display control means.

* * * * *